United States Patent [19]

Lazzari

[11] 4,012,782

[45] Mar. 15, 1977

[54] READ-ONLY INTEGRATED MAGNETIC HEAD

[75] Inventor: Jean-Pierre Lazzari, Montfort L'Amaury, France

[73] Assignee: Compagnie Internationale Pour L'Informatique, Louveciennes, France

[22] Filed: Aug. 12, 1975

[21] Appl. No.: 604,058

[30] Foreign Application Priority Data

June 19, 1975 France .............................. 75.19167

[52] U.S. Cl. .............................. 360/123; 360/121; 360/127
[51] Int. Cl.² ....................... G11B 5/20; G11B 5/14
[58] Field of Search .......... 360/124, 121, 123, 126, 360/127, 113

[56] References Cited

UNITED STATES PATENTS 3,979,775  9/1976  Schwartz .......................... 360/113

*Primary Examiner*—Robert S. Tupper
*Attorney, Agent, or Firm*—Kemon, Palmer & Estabrook

[57] ABSTRACT

The invention provides a structure for a read-only integrated magnetic head which, without any recourse to a shield, ensures or at least enables the elimination from the read-out signal transferred from the head to the external circuits it must feed, any component which might be due to the application of spurious electromagnetic fields to the surface comprised by the flat conductor winding coil and to the surface intervening between the output leads of said coil up to the rear edge of the substrate which carries the integrated magnetic head.

An additional flat conductor winding coil is provided over the read-out coil. Said two coils register but they are mutually magnetically decoupled, by means for instance of an intervening non-magnetic dielectric layer of appropriate thickness. Said two coils are so interconnected, either within the structure proper of the head or from their external leads, that the current components which are generated in said coils by the said spurious electromagnetic fields are opposed so that the spurious current component from the read-out coil is balanced.

17 Claims, 10 Drawing Figures

READ-ONLY INTEGRATED MAGNETIC HEAD

SUMMARY OF THE INVENTION

The present invention concerns improvements in or relating to read-only integrated magnetic heads.

It is an object of the invention to provide a new and improved structure of a read-only integrated magnetic head which, though not including any electromagnetic shield, incorporates means enabling the elimination from its output signal of any spurious component which may be due to the action of external parasitic magnetic and electromagnetic fields while preserving the response of the head to the variations of the read-out signal from the record track with which said head incorporates.

As known, an integrated magnetic head is of special advantage when mounted as a component of a multi-head "bar" carrier such as the ones used in magnetic disk equipment and the like. In such a carrier the magnetic integrated heads are arranged in at least one row. Each head of this assembly is in close proximity to the other ones. It may be that some of the heads will read while other ones will simultaneously write. Except when shielded, any head during a writing operation radiates an electromagnetic field. Said field will disturb the operation of a neighbouring head which is reading a track by generating a spurious component in the electrical current thereof. This is for instance the case when a multi-head bar includes read-only heads intended to act as sensors of the position of the bar with respect to the tracks. Said read-only, or "servo" heads are all the more useful when the width of the tracks is narrow.

The present trend in magnetic recording equipment is to an increase of density of the records, mainly by narrowing the width of their tracks and the spacing from track to track. Consequently, it is more and more difficult to provide individual magnetic and electromagnetic shields between the integrated heads. This is a minor problem as concerns the read/write heads since they always simultaneously operate either to write or to read. On the other hand, any read-only head, i.e. any "servo" head of the assembly ought to be protected against such spurious electromagnetic fields as herein above defined.

According to a feature of the invention, a read-only integrated magnetic head comprises first and second winding coils one of which is protected against the magnetic signal field and the electrical currents from the coils are combined for eliminating the spurious component from the final signal current.

BRIEF DESCRIPTION OF THE DRAWINGS

The invention will be described in full detail with reference to the accompanying drawings, wherein.

Figure 9:
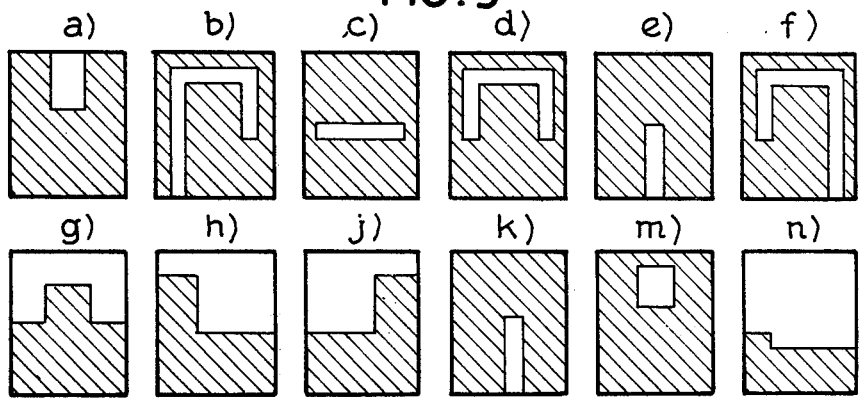
FIG. 9 shows a number of masks for enabling the formation of a read-only head according to the invention by an evaporation process technique, and, FIG. 10 shows views of a multi-head assembly according to U.S. Pat. No. 3,846,841 dated Nov. 5, 1974.

It must be noted that the masks from (a) to (j) in FIG. 9 are reproduced from U.S. Pat. No. 3,846,842 dated Nov. 5, 1974.

Both patents are assigned to the same assignee as is the present application.

Figure 3:
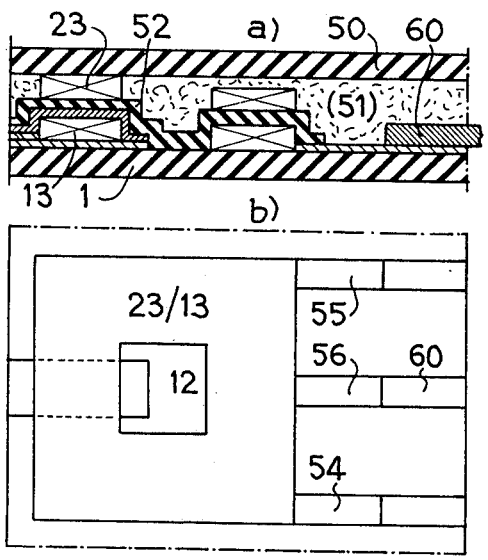
FIG. 3 shows a first embodiment of a read-only head structure according to the invention.
Figure 5:
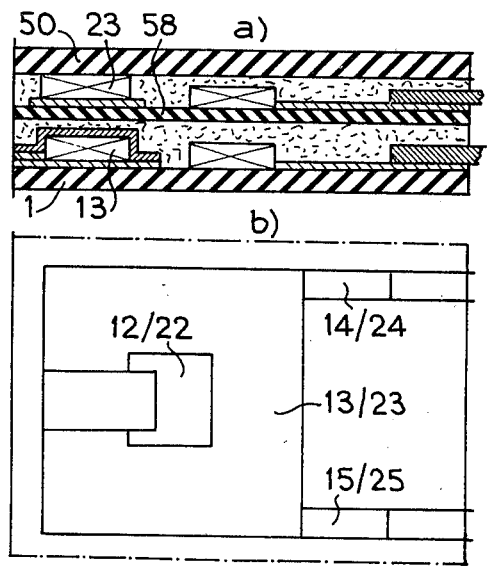
FIG. 5 shows a second embodiment of a read-only head structure according to the invention.

In both FIGS. 3 and 5, view (a) is a cross-section longitudinal view, view (b) is a top view and view (c) is a cross-section transversal view of the structure.

Figure 10:
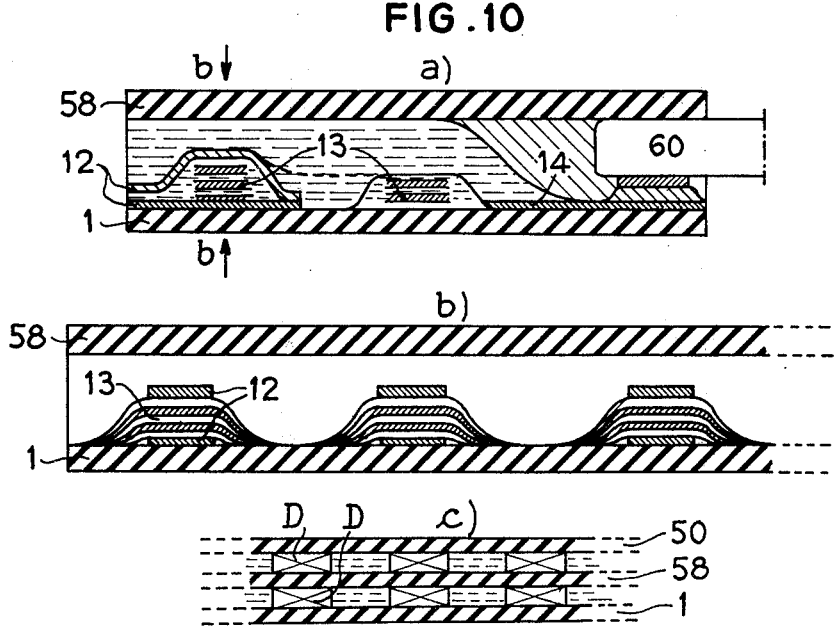

In FIG. 10, view (a) is a cross-section longitudinal view of a head, view (b) is a transverse partial cross-section view of a multi-head assembly and view (c) shows an arrangement having two levels of head rows.

From the above examples may be directly derived any structure within the scope of the invention as defined by the appended claims.

DETAILED DESCRIPTION

Figure 1:
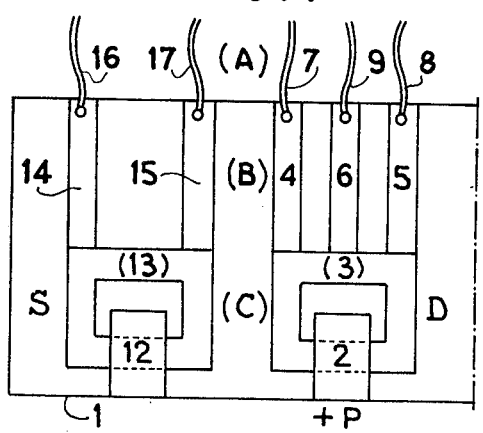
FIG. 1 shows a read-only head and an adjacent read/write head on the same carrier substrate.

Referring to FIG. 1, two integrated magnetic heads are shown, a "servo" head S and a "data" head D. S is a read-only head. D is a read/write head. They are arranged side by side on a substrate 1, and are spaced apart by the distance between two adjacent tracks of a magnetic recording medium, not shown, which moves in close proximity to the front edge of the substrate 1 in a direction P perpendicular to the plane of the representation.

The "data" head D conventionally comprises a pair of superposed pole-piece layers 2 and a flat conductor winding coil 3 the front branch of which is inserted between the pole piece layers 2. The usual three output leads 4, 5 and 6 extend from the coil to the rear edge of the substrate 1. Said leads are made of flat conductors on the substrate. Lead 6 is connected to a mid-tap point of the coil (3). Wires 7, 8 and 9 are shown connected to the rear part ends of the leads 4, 5 and 6. They are intended for the necessary connection of the head to external circuits such as the amplifier 57 shown in FIGS. 4 and 6.

The "servo" head S conventionally comprises a pair of superposed pole-piece layers 12 and a flat conductor winding coil (13) provided with a pair of output leads 14 and 15 to the rear edge of the substrate. Wires 16 and 17 are connected to the rear ends of the leads 14 and 15. Said leads are made of flat conductor on the substrate. The wires are intended for the necessary connection of the head to external circuits. It is unusual, as being normally useless, to provide a read-only head winding coil with a mid-tap.

It is not at all necessary that the number of turns of the winding coils (3) and (13) and/or the widths of the pole-piece layers 2 and 12 be the same.

When the head (D) is operated for writing on the recording medium, it is fed with a writing electrical current. Consequently, it also acts as a transmitter of electromagnetic waves in its surrounding space. The head S, further to its normal reading function, then also acts as a receiver of said waves. Such an electromagnetic coupling from D to S generates in the coil 13 a spurious current component, and also in the leads 14, 15 and in the wires 16 and 17.

In the head S, the said spurious current component is superposed on the true read-out current which is generated by the action of the variable magnetic fields emanating from the record. Such fields are closely confined to the magnetic gap portion of the head.

In zone (A), the electromagnetic coupling between the wires 7, 8 and 9 and the wires 16 and 17 could be destroyed by appropriately shielding the wires. However, when the head assembly is mounted on a slider which "flies" at a short distance from the rotating surface of a magnetic disc, such shields are difficult to establish since the wires must, in most of their length, remain relatively flexible.

In zones (B) and (C), the couplings could be eliminated by providing appropriate shielding structures in the assembly, though the coupling between the coils is far greater than the coupling between the leads. But, as said, the spacings between the leads should be smaller for increasing the densities of the tracks on a recording medium, so small that even such shields will finally be of poor efficiency as they cannot be made of sufficient thickness.

Happily, however, the electromagnetic coupling between such heads as S and D is linear all along the said zones.

Figure 2:
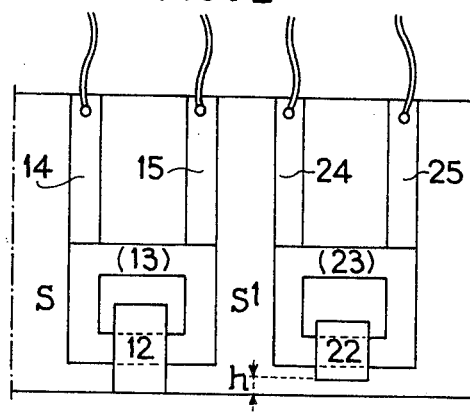
FIG. 2 shows a read-only head structure and a "compensation"head structure which are shown side by side for the sake of the clarity.

FIG. 2 shows two magnetic head structures, arranged side by side for the sake of clarity though, according to the invention, they must be considered as superposed and will actually be so. The left-hand structure S is a conventional read-only integrated magnetic head as it has herein above been described. The other structure $S^1$ is identical to S in all respects but for the magnetic pole-piece layers 22 which have an edge recessed by a distance $h$ from the front edge of the substrate. The distance $h$ is made such that the coil 23 of the structure cannot receive any substantial magnetic flux from the record track. Normally, then, no electrical current will be generated in said coil and the output signal collected across the output leads 24 and 25 must be zero. However, due to the reception of the said electromagnetic waves from any neighbouring writing head, an electrical current component will appear in the coil and in the leads of the structure $S^1$, substantially identical to the similar electrical component which is generated by the same electromagnetic waves in the coil (13) and the leads 14 and 15 of the structure S.

"Subtracting" the electrical current of the coil (23) from the electrical current of the coil (13) will balance the spurious components out of the final output. In other words any spurious signal component will be eliminated from the read-out signal, as collected from the composite magnetic head structure. When the coils (13) and (23) are of identical winding direction, subtraction is obtained by placing the two currents, or the voltages derived therefrom across the leads, in actual opposition. When, on the other hand, the winding of the coils (13) and (23) are of reverse directions, subtraction is obtained by adding the two currents or the two voltages derived therefrom across the output leads.

No technical problem will exist for the choice of the distance $h$ by which the pole-pieces such as 22 must be recessed from the edge of the substrate:—as demonstrated in a co-pending application of the same Applicant executed and filed concurrently herewith Ser. No. 598,000 and assigned to the same assignee, an application based on French Patent Application No. 75 00 652 filed Jan. 10, 1975. Such a distance $h$ will not exceed a value of about 5 microns with a magnetic gap width of about 20 microns, at the front edge of the substrate. Such dimensions are now quite compatible with the presently made integrated magnetic head structures.

It may be further noted that, if at least one magnetic layer such as 22 is preserved in the complete $S^1$ structure, with a view to controlling to a certain extent the action of the electromagnetic waves, such pole-piece layers will, in most cases, be superfluous and be consequently omitted in the complete structure of a read-only magnetic head according to the invention.

But, in order that the coil (23) be unaffected by the magnetic fields from the record, it is further imperative that it is magnetically decoupled from the fields generated by the passage of the read-out current in coil (13). It is provided to insert a decoupling non-magnetic dielectric layer between the two structures S and $S^1$ (whether or not reduced to coil (23). Such a decoupling layer must only be of a thickness of about 2 to 3 microns and, of course may be thicker if desired.

Figure 4:
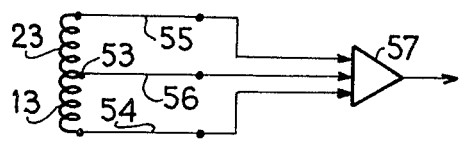
FIG. 4 shows an electrical circuit for use of said embodiment.

A first illustrative embodiment of a read-only head according to the invention is shown in FIG. 3, wherein the decoupling layer is shown at 52. In the embodiment of FIG. 3, the coils 13 and 23 are considered as galvanically interconnected by a thru-connection 53 through the decoupling layer 52. This is shown in FIG. 4 and will be later explained with reference to FIG. 9, though the galvanic connection does not appear in the views of FIG. 3. FIG. 4 shows the electrical diagram of the head of FIG. 3 and of its connection to an output amplifier 57.

An output lead 56 is provided from the interconnection point 53 to the rear edge of the substrate and the end output leads of the coils 13 and 23 are shown at 54, for coil 13 and 55 for coil 23. In the embodiment of FIG. 3, the lead 56, is a mid-point lead from an electrical point of view, since coils 13 and 23 are identical, consequently of identical number of turns, but is also positioned mid-way between the leads 54 and 55 on the substrate so that equal surfaces are defined between 54-56 and 56-55. This geometry ensures generation of identical current components in the lads 54 and 55 due to the reception of the spurious electromagnetic waves. The superposition and identity of the coils 13 and 23 will ensure generation of spurious current components of identical values in the coils.

Wires 60 are connected to the rear ends of the three leads 54, 55 and 56. They are illustrated as massive conductors in the shown embodiment and the arrangement of views (a) and (c) of FIG. 3 will be described in more detail with reference to FIG. 10.

As shown in FIG. 4, the output leads are connected by the wires to appropriate inputs of an amplifier 57. The input connected to lead 56 is a reference. Assuming first that the coils 13 and 23 have the same winding direction since, the amplifier 57 is a differential amplifier the output is proportional to the difference of the inputting currents. When, on the other hand, the winding directions of the coils are reverse, amplifier 57 will sum the inputting currents. In both cases, the spurious component will be eliminated from the output.

It must be noted that, from a purely electrical point of view, when the directions of winding of the coils are reverse, a lead such as 56 may be considered as superfluous. The spurious current components will balance within the "global" coil. Such an omission can be made but only when the spurious components generated in the leads 54 and 55 are quite small, for instance when said leads are made quite close to one another on the surface of the substrate and/or their length is quite short.

In the embodiment of FIG. 5, the structure $S^1$ is carried on a substrate 58 which is intermediate between the substrate 1 over which is formed the structure S and a protective plate 50 applied over the complete structure of the head. Such a protective plate 50 also exists in the embodiment of FIG. 3. Illustratively in FIG. 5, a magnetic layer 22 is shown associated with the coil 23. As for the embodiment of FIG. 3, further details will be given with reference to FIG. 10.

Figure 6:
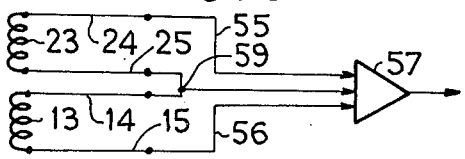
FIG. 6 shows an electrical circuit for use of said embodiment.

The pair of output leads 14-15 of coil 13 and the pair of output leads 24-25 of coil 23 are superposed though, of course, relatively insulated. Each pair consequently embraces an identical surface. As shown in FIG. 6, which is a circuit diagram representation of the head together with its output circuit, the leads 14 and 25 are connected externally to the head structure proper, at 59, so that the output amplifier 57 receives the currents from the head in the same way as in FIG. 4.

Figure 7:
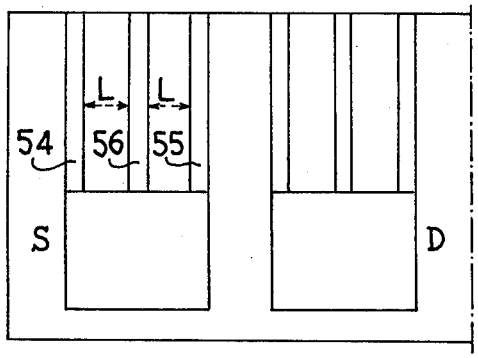
FIG. 7 shows a read-only magnetic head according to FIG. 3 on one side of a read/write magnetic head on the same carrier substrate.
Figure 8:
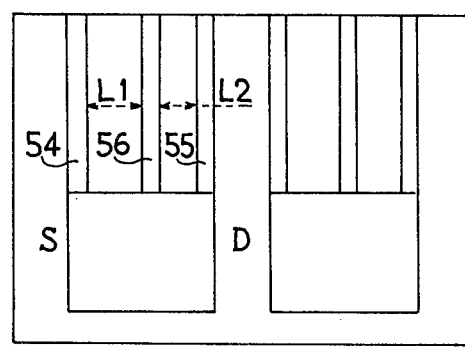
FIG. 8 shows a modification of the read-only head in such an arrangement as the one shown in FIG. 7.

Referring to FIG. 7, a read-only magnetic head according to the invention, more particularly according to the embodiment of FIG. 3 is shown on one side of a data (read/write) head D and it is assumed that the read-only head is the last one in the left-hand direction on the multiple head carrier substrate 1. It is obvious that, in such a case, the surfaces between the leads 54 and 56 and between the leads 56 and 55 will not receive the electromagnetic waves from D with the same intensity. When it is considered that such a condition may damage the compensation of the spurious currents, a simple scheme may correct the inequalities of intensities and is shown in FIG. 8. Instead of preserving the same spacing L from 54 to 56 and from 56 to 55, the lead 56 is shifted towards the lead 55 so that the spacing L1 between 54 and 56 is greater than the spacing L2 between 56 and 55. The size of the shift is easy to compute since, as said, the coupling between D and S is linear.

Now, in U.S. Pat. No. 3,846,842, a method of manufacturing integrated magnetic heads is described which is based on the use of the thermal evaporation of the materials of the layers through masks appropriately defined for enabling a progressive development of the head structure on the substrate. The masks of the said patent are first shown in the views (a) to (j) of the FIG. 9. Three further masks are shown in views (k), (m) and (n). They complement the masks (a) to (j) for enabling the manufacturing of read-only heads according to the present invention.

Mask (a) is used for depositing any such magnetic pole-piece layer as 12. Mask (m) may be used for depositing any such magnetic layer as 22, when required.

Masks (b), (c), (d), (f) are used for progressively forming a helical winding coil from an input lead, mask (b) to an output lead, mask (f). Mask (e) may be used each time an intermediate tap output lead is useful. However, when a shifted lead is wanted, as for instance a lead such as shown in FIG. 8, an additional mask of such a group is such as shown at (k) in FIG. 9.

Insulation between the pole-piece layers and the conductive layers together constituting the coil and between the said conductive layers, such masks as shown at (g), (h) and (j) were provided in the above identified U.S. patent. When, further, a thick non-magnetic layer must be inserted between such structures as S and $S^1$ with a thru-connection between the coils 13 and 23, it is necessary to provide a further mask as, for instance, the one which is shown at (n) in FIG. 9. When no such thru-connection is necessary, no mask is necessary, the layer is deposited over the complete surface of the already made layers on the substrate.

Illustratively, the integrated part of the structure which is shown in FIG. 3 may be manufactured as follows with such masks:

A first deposit of an anisotropic magnetic material is made on the surface of the substrate. Said deposit constitutes the lower pole-piece layer 12. A dielectric layer is then formed through the mask (g). Thereafter a ten turn helical flat conductor winding coil, i.e. coil 13, is made by utilizing in a rotary fashion the masks (b), with a conductive non-magnetic material, (g), with a dielectric material, (c), with a conductive non-magnetic material, (h), with a dielectric material, (d), with a conductive non-magnetic material, (j), with a dielectric material, (c), with a conductive non-magnetic material, (h) with a dielectric material, (d) with a conductive non-magnetic material, and so forth from the first deposition of a layer through (d), up to the ten turns of the winding coil 13, ending by a layer (c). Thereafter the mask (a) is again used for depositing the second magnetic pole-piece layer 12. Mask (n) is then used for depositing the decoupling layer 52 and, over said decoupling layer is formed the coil 23, beginning by a new conductive layer (c), a conductive layer through either mask (e) or mask (k) for obtaining the intermediate output tap and a dielectric layer through mask (k). The above defined sequence is reinstated for forming the ten turns of the coil 23, ending by a conductive layer deposited through mask (f).

Application of this process to the manufacturing of the head structure of FIG. 5 is obvious, each coil beginning with a conductor layer (b) and ending with a conductor layer (f).

In the above and U.S. patent, further, Applicant teaches the modification of sequence of the masks to operate in order that a reversal of the direction of the turns occur during the manufacturing of a coil. Said teaching may be plainly used when it is desired that, in a head according to the invention, coils 13 and 23 be of reverse directions of their turns. Briefly summarized, the reversal steps consist of depositing a dielectric layer through mask (h), a conductor layer through mask (c) and again a dielectric layer through mask (h), to be followed by a deposition of conductor material through mask (d).

In U.S. Pat. No. 3,846,841, Applicant further describes embodiments of multiple head structures wherein the heads are formed either on a single substrate such as 1, FIG. 10, views (a) and (b), or on superposed substrates such as 1 and 58, view (c). Such teachings are obviously applied in the embodiments of FIGS. 3 and 5 of the present invention. A further teaching of this patent concerns the wires 60 soldered to the rear ends of the flat conductor output leads of the head. Said wires 60 are made of flat, i.e. square or rectangular section, wires. A primary protection is ensured by coating the head structures with a dielectric material and a secondary protection by placing a dielectric plate over the complete structure. Such a teaching is further obviously applied in FIGS. 3 and 5 of the present disclosure.

A read-only integrated magnetic head according to the invention ensures an attenuation by at least 20 decibels of the noise which may be generated by the electromagnetic waves from a neighbouring head whereas the attenuation of the noise was in optimal conditions only by 3 to 4 decibels for individually shielded heads.

What is claimed is:

1. A read-only integrated magnetic head device subject to spurious electro-magnetic fields which are generated externally to the head by neighboring electromagnetic field sources comprising:
    a non-magnetic sub-strate having front and rear edges;
    first and second flat-conductor winding coils of substantially identical dimensioning and coverage supported on said sub-strate;
    output leads extending from said first and second flat conductor winding coils to the said rear edge of said sub-strate;
    a pair of magnetic pole-piece layers spaced apart at front edges thereof to define a magnetic gap at said front edge of said sub-strate and having a part of said first flat conductor winding coil inserted between them;
    means decoupling said second flat conductor winding coil from any magnetic field generated by said pair of pole-piece layers and said first flat conductor winding coil;
    means for eliminating from the readout current any component due to spurious electro-magnetic fields by opposing the electrical current generated in said second flat conductor winding coil by external spurious electro-magnetic fields by the current component identically generated in said first flat conductor winding coil by the same external spurious electro-magnetic fields.

2. Device according to claim 1 wherein a magnetic layer having an edge recessed with respect to the front edge of said sub-strate extends over a part of said second flat conductor winding coils nearest said edge.

3. Device according to claim 1 wherein said magnetic field decoupling means consists of a non-magnetic member, thick relative to said pole-pieces and inserted between said second flat conductor winding coil and the readout structure comprises said first flat conductor winding coil and said magnetic pole-piece layers.

4. Device according to claim 3 wherein said first and second flat conductor winding coils are galvanically interconnected by a connection extending through said decoupling member, said coils are wound in opposite directions and two output leads are connected to the free ends of the coils respectively.

5. Device according to claim 3 wherein said decoupling means consists of a dielectric layer coated over said readout structure.

6. Device according to claim 3 wherein said decoupling means consists of an additional sub-strate applied over and secured to said readout structure.

7. Device according to claim 3 wherein each of said first, second flat conductor winding coils is provided with a separate pair of output leads and said current opposing means comprises circuit means having inputs connected to the rear edge end of the leads of said pair.

8. Device according to claim 7 wherein said first and second flat conductor winding coils are wound in the same direction and said circuit means subtracts the electrical current of the second coil from the electrical current collected from the first coil.

9. Device according to claim 7 wherein said first and second flat conductor winding coils are wound in reverse directions and said circuit means adds the electrical current collected from the first coil to the electrical current collected from the second coil.

10. Device according to claim 3 wherein said first and second flat conductor winding coils are galvanically interconnected by a connection extending through said decoupling member and a common output lead extends from said interconnection to the rear edge of said sub-strate at a geometrical location intermediate the locations of the two other output leads from the free ends of the coils.

11. Device according to claim 10 wherein said first and second flat conductor winding coils are wound in the same direction and said electrical current opposing means consists of circuit means for subtracting the electrical current collected from the output lead of said second coil and said common output lead from the electrical current collected from the output lead of said first coil and said common output lead.

12. Device according to claim 10 wherein said first and second flat conductor winding coils are wound in reverse direction and said electrical current opposing means consists of circuit means for adding the electrical current collected from the output leads in the coils and said common output leads.

13. Device according to claim 10 wherein the location of said common output lead is geometrically shifted laterally with respect to locations of the two other output leads on said sub-strate.

14. A read-only, integrated magnetic head device subject to spurious electro-magnetic fields which are generated externally of the head by neighboring electromagnetic field sources comprising a combination of a readout magnetic head structure having a flat conductor winding coil a part of which passes between a pair of magnetic pole-piece layers, a further flat conductor winding coil over the said structure, a decoupling insulating layer between said further flat conductor winding and said flat conductor winding coil and magnetic pole-piece layer facing said further flat conductor winding coil and means connecting the electrical currents generated in said coils by extraneous spurious electromagnetic fields in opposition to each other for eliminating from the read out current any component due to the said spurious electro-magnetic field.

15. A read-only integrated magnetic head device subject to spurious electro-magnetic fields generated externally to the head by neighboring electro-magnetic field sources comprising the combination of the first magnetic head structure having a flat conductor winding coil a part of which passes between a pair of magnetic pole-piece layers defining a readout magnetic gap at one edge thereof, a second magnetic head structure, having a flat conductor winding coil, a part of which passes between a pair of magnetic pole-piece layers recessed with respect to the magnetic gap edge of the first structure, said second magnetic head structure being arranged over the first, a non-magnetic decoupling member between said first and second magnetic head structures, and means connecting the electrical current components generated in both the first and second head structures by extraneous spurious electromagnetic fields in opposition to each other for eliminating from the readout current any component due to said spurious electro-magnetic fields.

16. A read-only integrated magnetic head structure device comprising in combination:
   a sub-strate, having a front edge and a rear edge;
   a first pole-piece layer formed on a face on the sub-strate and having an edge registering with said front edge of sub-strate;
   a first flat conductor winding coil having a part nearest to said edge over said first pole piece layer and encompassing a first surface parallel to said face of said sub-strate;
   a second pole piece layer formed over said first pole piece and said part of said first flat conductor winding coil having an edge registering with the front edge of said sub-strate which is spaced from the front edge of said first pole piece layer to define a magnetic gap there between;
   a dielectric non-magnetic layer thick relative to said pole pieces over said second pole piece layer and said first flat conductor winding coil; A second flat conductor winding coil over said dielectric non-magnetic layer; Output flat conductor leads extending over said sub-strate from said first and said second flat conductor winding coils to the rear edge of the said sub-strate; means connecting the electrical currents generated in said coils by extraneous spurious electromagnetic fields in opposition to each other for eliminating from the read out current any component due to the said spurious electromagnetic field.

17. Combination according to claim 16, further comprising a magnetic layer having an edge recessed with respect to said front edge of said sub-strate and applied against said second flat conductor winding coil.

* * * * *